(12) United States Patent
Murison et al.

(10) Patent No.: US 11,367,029 B2
(45) Date of Patent: Jun. 21, 2022

(54) SYSTEM AND METHOD FOR ADAPTIVE SKILL LEVEL ASSIGNMENTS

(71) Applicant: Genesys Telecommunications Laboratories, Inc., Daly City, CA (US)

(72) Inventors: James Murison, Markham (CA); Johnson Tse, Markham (CA); Gaurav Mehrotra, Toronto (CA); Anthony Lam, Richmond Hill (CA)

(*) Notice: Subject to any disclaimer, the term of this patent is extended or adjusted under 35 U.S.C. 154(b) by 361 days.

(21) Appl. No.: 16/802,538

(22) Filed: Feb. 26, 2020

(65) Prior Publication Data

US 2020/0272976 A1 Aug. 27, 2020

Related U.S. Application Data

(60) Provisional application No. 62/811,182, filed on Feb. 27, 2019.

(51) Int. Cl.
| | |
|---|---|
| G06Q 10/06 | (2012.01) |
| G06N 3/08 | (2006.01) |
| G10L 15/22 | (2006.01) |
| G10L 15/18 | (2013.01) |
| G10L 15/16 | (2006.01) |
| G10L 15/04 | (2013.01) |
| G10L 15/08 | (2006.01) |

(52) U.S. Cl.
CPC ....... *G06Q 10/063112* (2013.01); *G06N 3/08* (2013.01); *G10L 15/04* (2013.01); *G10L 15/16* (2013.01); *G10L 15/1815* (2013.01); *G10L 15/22* (2013.01); *G10L 2015/088* (2013.01); *G10L 2015/223* (2013.01)

(58) Field of Classification Search
CPC .. G06Q 10/063112; G06N 3/08; G10L 15/04; G10L 15/16; G10L 15/1815; G10L 15/22; G10L 15/26; G10L 2015/088; G10L 2015/223; G10L 25/63; H04M 2203/401; H04M 2203/402; H04M 2201/40; G06F 40/279; G06F 40/30
See application file for complete search history.

(56) References Cited

U.S. PATENT DOCUMENTS

| | | | |
|---|---|---|---|
| 9,247,066 B1 * | 1/2016 | Stec | H04M 3/5166 |
| 9,313,332 B1 * | 4/2016 | Kumar | H04M 3/5166 |
| 9,848,082 B1 * | 12/2017 | Lillard | H04M 3/53341 |

* cited by examiner

*Primary Examiner* — Michelle M Koeth
*Assistant Examiner* — Darioush Agahi

(57) ABSTRACT

A system and method are presented for adaptive skill level assignments of agents in contact center environments. A client and a service collaborate to automatically determine the effectiveness of an agent handling an interaction that has been routed using skills-based routing. Evaluation operations may be performed including emotion detection, transcription of audio to text, keyword analysis, and sentiment analysis. The results of the evaluation are aggregated with other information such as the interaction's duration, agent skills and agent skill levels, and call requirement skills and skill levels, to update the agent's profile which is then used for subsequent routing operations.

20 Claims, 5 Drawing Sheets

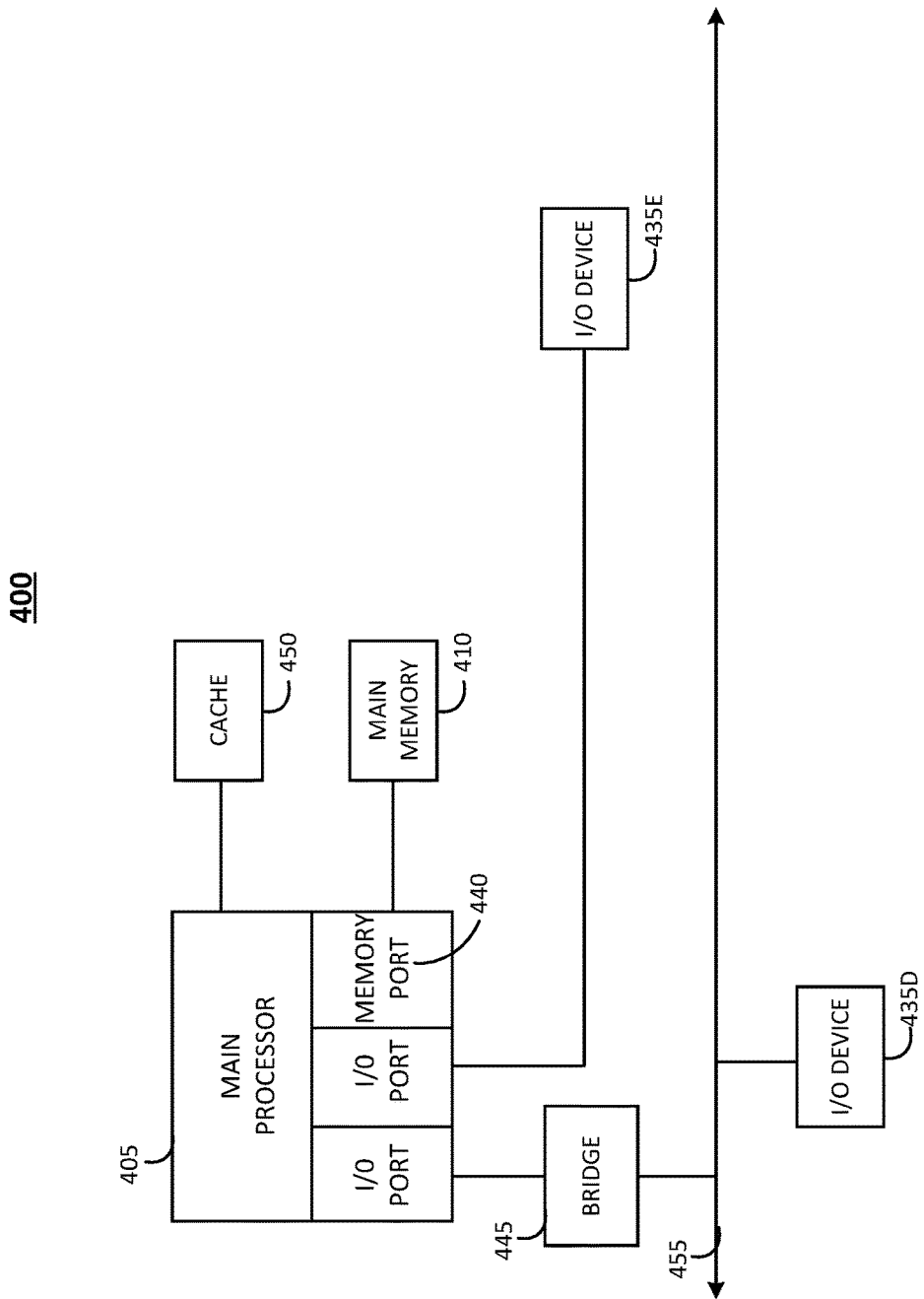

SYSTEM AND METHOD FOR ADAPTIVE SKILL LEVEL ASSIGNMENTS

CROSS REFERENCE TO RELATED APPLICATION

This application claims the benefit of U.S. Provisional Patent Application No. 62/811,182, titled "SYSTEM AND METHOD FOR ADAPTIVE SKILL LEVEL ASSIGNMENTS", filed in the U.S. Patent and Trademark Office on Feb. 27, 2019, the contents of which are incorporated herein.

BACKGROUND

The present invention generally relates to telecommunications systems and methods, as well as skills-based routing solutions in a contact center environment. More particularly, the present invention pertains to automatically adapting the skill level assignments of agents in the contact center.

SUMMARY

A system and method are presented for adaptive skill level assignments of agents in contact center environments. A client and a service collaborate to automatically determine the effectiveness of an agent handling an interaction that has been routed using skills-based routing. Evaluation operations may be performed including emotion detection, transcription of audio to text, keyword analysis, and sentiment analysis. The results of the evaluation are aggregated with other information such as the interaction's duration, agent skills and agent skill levels, and call requirement skills and skill levels, to update the agent's profile which is then used for subsequent routing operations.

In one embodiment, a method is presented for automatically adjusting skill level assignments of agents in a contact center environment comprising the steps of: obtaining a plurality of recordings corresponding to a plurality of interactions corresponding to an agent of the contact center environment from a recording system associated with the contact center; invoking a client, by the recording system, and providing metadata describing each of the plurality of interactions to the client; invoking, by the client, a service for evaluation of handling of an interaction by the agent, wherein the client provides the metadata to the service; performing, by the service, a number of evaluation operations on the audio of each of the plurality of recordings, wherein the number of evaluation operations comprise: emotion detection; segmentation of the audio into a plurality of segments; speech recognition of each of the plurality of segments; keyword recognition on each of the plurality of segments; and sentiment analysis; providing the results of the evaluation operations, metadata, and interaction duration to a neural network where the neural network determines effectiveness of the agent on handling each of the plurality of interactions; and updating the skill level assignments of the agent based on the effectiveness determination.

The metadata comprises at least one of: interaction identifier, duration of interaction, participants to the interaction, agent skills, skill level requirements, and interaction segments. The audio comprises two channels, and the two channels may be comprised of one channel containing the customer audio and one channel comprising the agent audio.

The emotion detection determines the emotion experienced by the customer and the emotion experienced by the agent during the progress of an interaction.

Segments may be a defined interval of time in length.

The sentiment analysis analyzes the agent and the customer during interaction progression.

The effectiveness comprises comparing the agent against other interactions with similar skill requirements and other agents with similar skill levels and skills.

The updating comprises incrementing a skill level of the agent, decrementing a skill level of the agent, or leaving a skill level at an existing value.

In another embodiment, A system for automatically adjusting skill level assignments of agents in a contact center environment comprising: a processor; and a memory in communication with the processor, the memory storing instructions that, when executed by the processor, causes the processor to: obtain a plurality of recordings corresponding to a plurality of interactions corresponding to an agent of the contact center environment from a recording system associated with the contact center; invoke a client and providing metadata describing each of the plurality of interactions to the client; invoke a service for evaluation of handling of an interaction by the agent, wherein the client provides the metadata to the service; perform a number of evaluation operations on the audio of each of the plurality of recordings, wherein the number of evaluation operations comprise: emotion detection; segmentation of the audio into a plurality of segments; speech recognition of each of the plurality of segments; keyword recognition on each of the plurality of segments; and sentiment analysis; provide the results of the evaluation operations, metadata, and interaction duration to a neural network where the neural network determines effectiveness of the agent on handling each of the plurality of interactions; and update the skill level assignments of the agent based on the effectiveness determination.

BRIEF DESCRIPTION OF THE DRAWINGS

FIG. 4B is a diagram illustrating an embodiment of a computing device.

DETAILED DESCRIPTION

Figure 1:
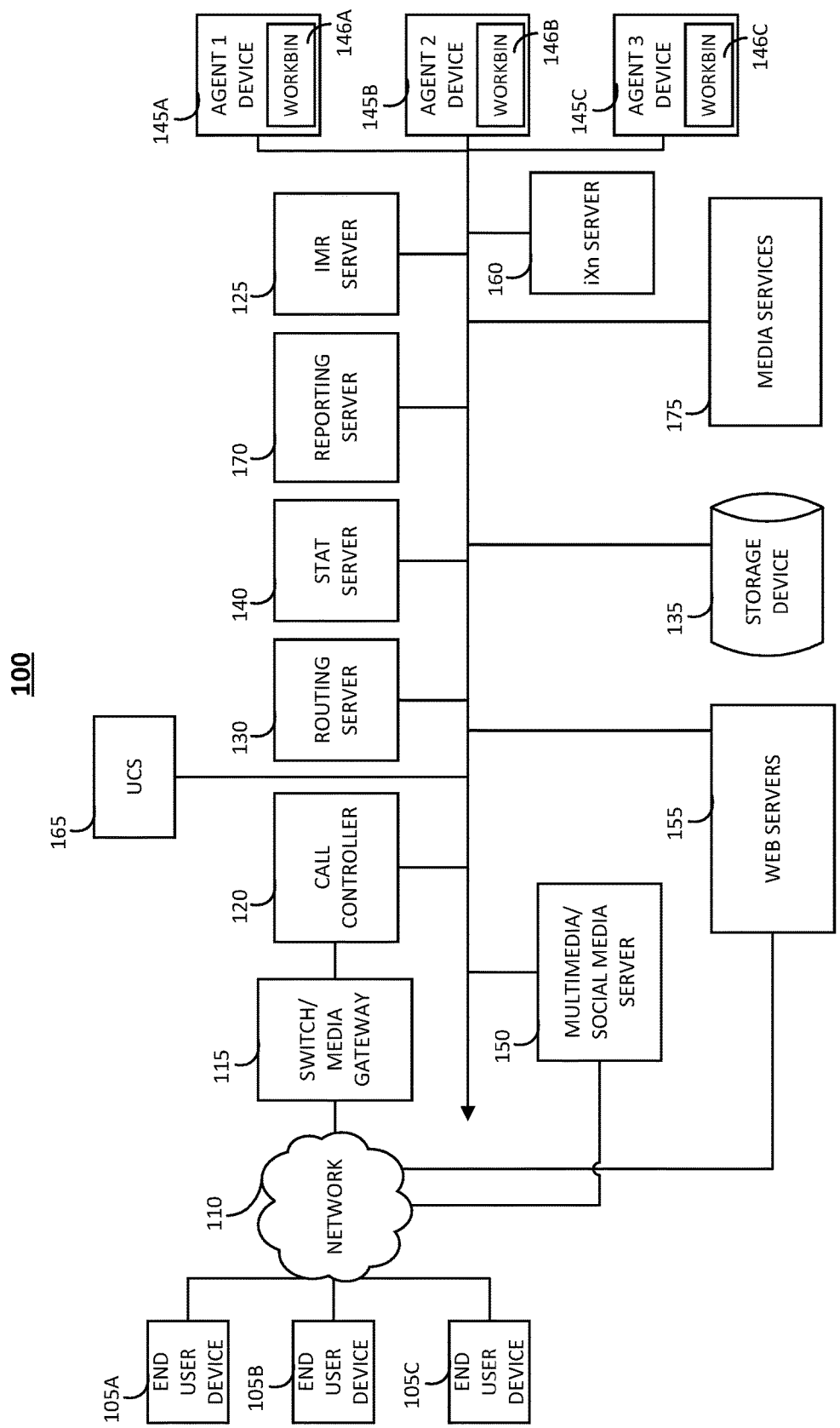
FIG. 1 is a diagram illustrating an embodiment of a communication infrastructure.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a contact center environment that uses a skills-based routing solution, agents are configured with a set of skills and, for each skill, a level of competency in that skill (a "skill level"). While agents may be initially evaluated and assigned appropriate skill levels to the skills the agent possesses at the time of evaluation, it becomes a problem to maintain this information as the agent becomes more experienced. Alternatively, it is also a problem to subsequently automatically adjust skill levels to lower values if the agent has been incorrectly identified with too high a level in certain skills. Manual quality monitoring of an agent can be performed, but it becomes burdensome to continually evaluate every agent in a contact center, particularly in large contact centers where the numbers of agents are in the thousands or higher.

In an embodiment, a client and a service collaborate to automatically determine effectiveness of an agent at handling an interaction that has been routed using skills-based routing within a contact center. The results of this evaluation and those of subsequent interactions handled by the agent are aggregated to update the agent's profile, which is then used for subsequent routing operations. The client comprises a software component that is deployed within the contact center environment. The service receives normalized data from the client and invokes different analysis steps to determine an overall evaluation of the agent's effectiveness at handling an interaction. This is compared against other interactions (which may be from the contact center historical data or from another source, such as pooled data across multiple other contact center environments) with similar skills requirements that were handled by agents with the same skills and skill levels as the agent being evaluated. A large sample size of interactions that the agent has handled may be evaluated before a skill level change recommendation is made for the agent.

An agent may be updated to be considered as less, the same, or more proficient in the skills that they have, based on the evaluation performed by the service. As an agent becomes more experienced, and demonstrative of their skills, the embodiments disclosed herein will automatically alter the levels on the agent's skills so that a skills-based routing engine can route appropriately complex interactions to the agent.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/ social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Figure 2:
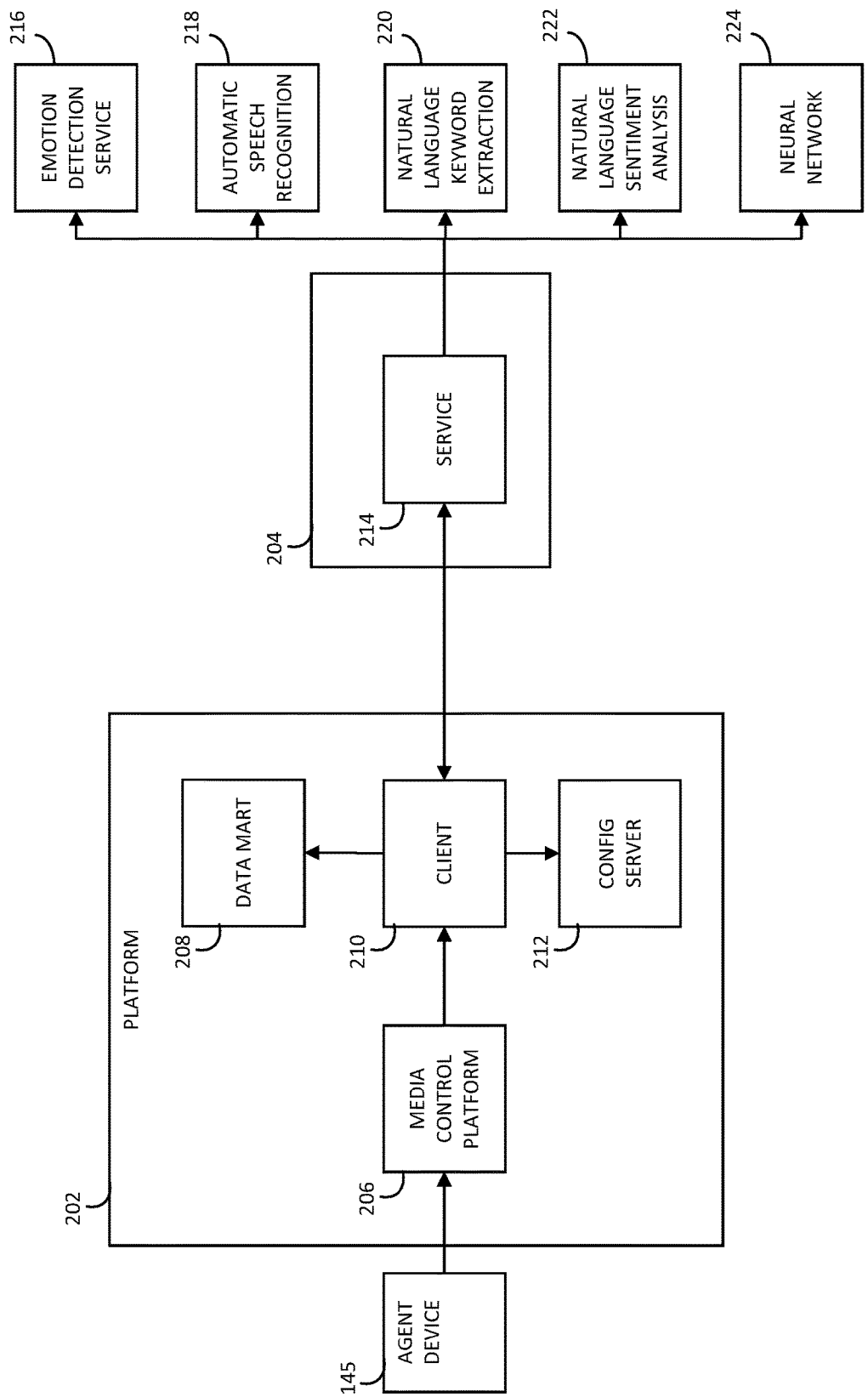
FIG. 2 is a diagram illustrating an embodiment of the system architecture for determining adaptive skill level assignments.
Figure 3:
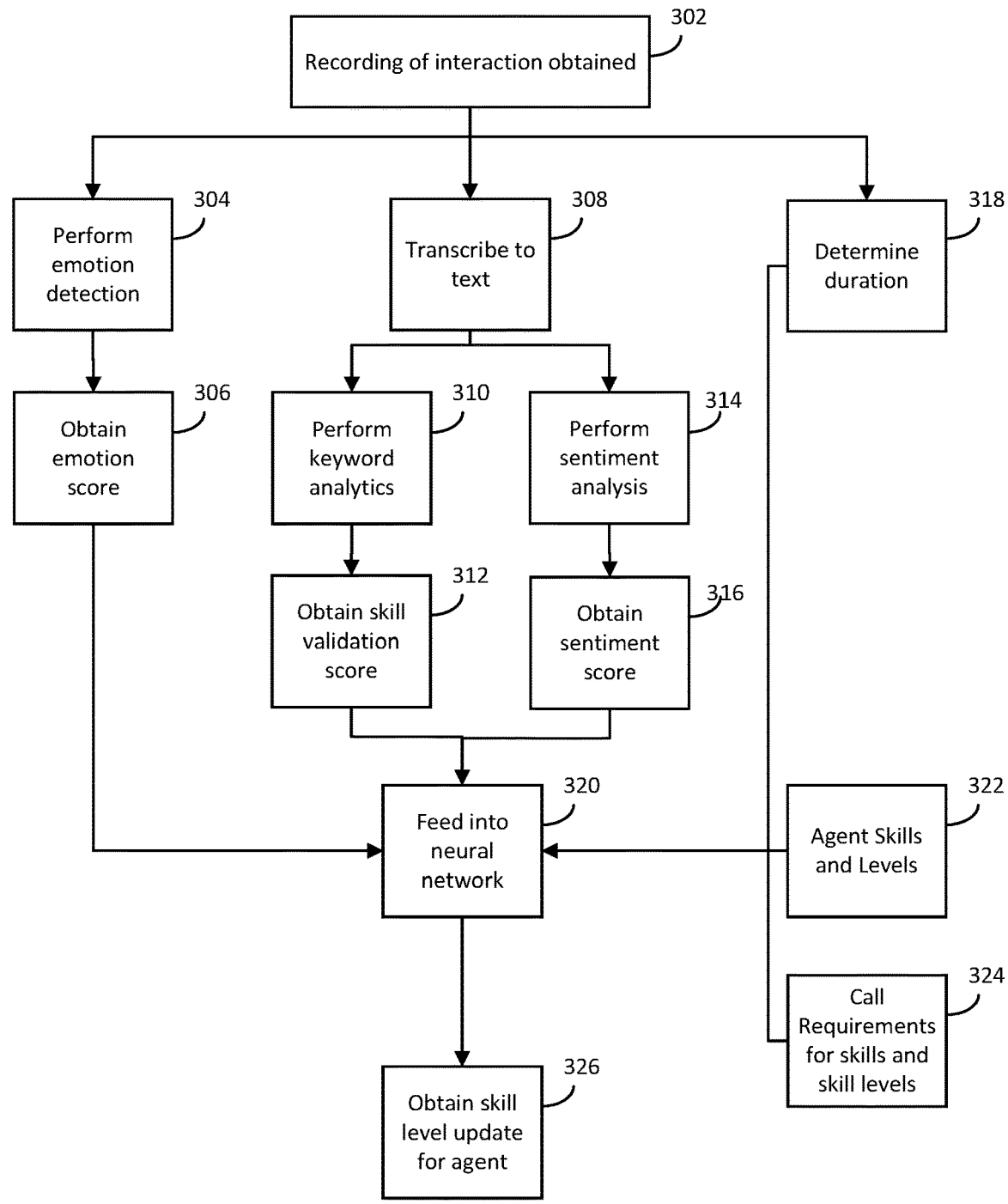
FIG. 3 is a flow diagram illustrating an embodiment of a process for determining adaptive skill level assignments.

FIG. 2 is a diagram illustrating an embodiment of the system architecture for determining adaptive skill level assignments, indicated generally at 200. The system 200 comprises components such as a platform 202 and a Central Management Console (CMC) 204. FIG. 3 is a flow diagram illustrating an embodiment of a process for determining adaptive skill level assignments, indicated generally at 300.

The process 300 occurs in the system architecture 200 (FIG. 2) and is described herein concurrently with the system 200.

The platform 202 comprises a hybrid system platform product in which some or all of the components may be hosted remotely, such as in a cloud-based environment. Additionally, the platform may provide access to and control of components of the system 100 through user interfaces (UIs) present on the agent devices 145A-C. The platform 202 comprises components such as a Media Control Platform (MCP) 206, a data mart 208, a client 210, and a config server 212. The MCP 206 performs a variety of functions, including, but not limited to, recording utterance data, recording audio and video, collecting call recordings, streaming audio data to an ASR server for speech recognition, supporting participants to conference calls using audio and video, performing call progress detection analysis, etc. The MCP 206 may store call recordings in a simple stores service that provides object storage through a web service interface, such as Amazon S3, for example. In an embodiment, the recordings are of interactions, such as a call representing a customer to agent interaction. The interaction is routed to an agent for handling at the agent device 145 using a skills-based routing system. The interaction is recorded by the MCP 206 and may be stored to a persistent recording storage location.

A recording of an interaction is obtained (302) by the client 210. For example, the MCP 206 recording uploader sends recording metadata to the client 210. The metadata comprises information describing the interaction (such as a call), including an identifier, the duration of the interaction, and the participants in the interaction. The interaction may be a telephone call, a video call, or some other type of interaction with audio. The client 210 connects to and gathers information on an agent that handled the interaction, such as an agent's skills and skill levels, requirements, etc., from the configuration server 212. The client 210 retrieves skill and skill level requirements for an interaction that were used to route the interaction at the time that it was being handled by the agent from the data mart 208. This information indicates the skills and skill levels that the agent was expected to demonstrate while handling the interaction. The number of segments contained within the interaction is also retrieved. In an embodiment, the number of segments indicates whether the agent was able to handle the interaction themselves or if other agents, managers, and/or supervisors were consulted to resolve the communication.

In an embodiment, the data mart 208 comprises a data extractor which extracts data from a database to produce the data mart 208 for the contact center's 100 historical reporting. A server component extracts, transforms, and loads data into the data mart 208 based on a schedule configured in the data mart 208 application. Low-level interaction data may be stored and consolidated from any number of interaction databases as well as processed data suitable for end-user reporting.

The client 210 invokes the service 214 and is supplied with full data (including the metadata and the agent information) and recording file location in the persistent recording storage for the evaluation process of the agent's handling of the interaction. The service 214 communicates with a variety of services including an emotion detection service 216, an automatic speech recognizer 218, a natural language keyword extractor 220, a natural language sentiment analyzer 222, and a neural network 224.

The CMC 204 serves as an administrator for managing content, servers, users, etc. The CMC 204 comprises the service 214 and provides access to other services and tools such as the emotion detection service 216, an automatic speech recognizer 218, a natural language keyword extractor 220, a natural language sentiment analyzer 222, and a neural network 224.

The service 214 retrieves the recording audio for the interaction from the persistent recording storage and performs a number of evaluation operations using the recording audio. The recording audio comprises two channels: one containing the customer audio and one containing the agent audio. Both audio channels are sent to the emotion detection service 216 to determine the emotion experienced by the customer and by the agent during the progress of the interaction as part of the agent evaluation. The emotion detection service 216 receives the recording audio from the service 214 and performs emotion detection, providing the results to the service (304). An emotion score may be obtained (306) as part of the results.

Both audio channels from the recordings are broken into a plurality of time interval blocks, also referred to as 'chunks', by the service 214. In an embodiment, a chunk may be 30 seconds in length. The length may be set by an administrator or be a default number for the system. The automatic speech recognizer 218 transcribes each chunk of the recording from the service 214 into text and provides the transcribed text chunks to the service 214 (308). The service 214 provides the transcribed text chunks to the natural language keyword extractor 220, where the chunks undergo keyword extraction (310). The results are provided to the service 214. A skill validation score may be obtained (312) as part of the results. The transcribed text chunks may be analyzed by the service 214 to determine if the agent was demonstrating the skills configured in their profile (based on keywords being spoken).

The service 214 sends the text chunks to the natural language sentiment analyzer 222 for sentiment analysis (314). The results are provided to the service 214, which may include a sentiment score (316). For example, with a call, the service 214 may determine if the customer sentiment improved during the call based on how the agent handled the call, whether the agent stayed calm during the call, etc. The duration of the interaction recording is also obtained (318). The service 214 provides the scoring results from processes 306, 312, 316, and 318 to the neural network 224 (320). Additional information and data, such as agent skills/skill levels (322) and call skill requirements (324) are also provided to the neural network 224 (320). The neural network 224 compares the results from the agents handling of the call against other calls with similar skill requirements and agents with the same skills and skill levels, to determine the overall effectiveness of the agent's handling of the call. In an embodiment, the neural network 224 comprises a cloud-based machine-learning platform enabling the creation, training, and deployment of machine-learning models, an example of which is Amazon SageMaker.

Once a suitable sample size of interactions has been analyzed for the agent, the service 214 communicates the results of the skill level assessment to the client 210. The sample size may be defined by an administrator to be sufficient sample size (e.g. 100 interactions). In another embodiment, the passage of a length of time could trigger the skill level assessment (such as a month or a 6 month period), instead of a number of interactions, depending on user settings.

In an embodiment, the interactions may be analyzed concurrently for each step of the process. In another embodiment, the interactions may be analyzed one at a time.

Recommendations may be provided on possible changes for each skill level for the agent (to increment, decrement, or leave each skill level at the existing value). The client 210 updates the agent's skill levels in the config server 212 should the skill levels need updating based on factors such as time and number of results (326). Depending on configuration (e.g. when the contact center is operating at an off-peak time), the client 210 uses the configuration system 212 to update the agent's skill levels appropriately. This ensures that subsequent interactions that are routed to the agent better fit the agent's capabilities.

In an embodiment, the analysis of interactions for updating an agent's skill levels can be performed on a recent interaction or may be done on a plurality of historical agent interactions. The plurality of historical agent interactions may be from a specific time frame in the agent's history, such as for the past week, the past month, or a past day, for example.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 4A, 4B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 4A:
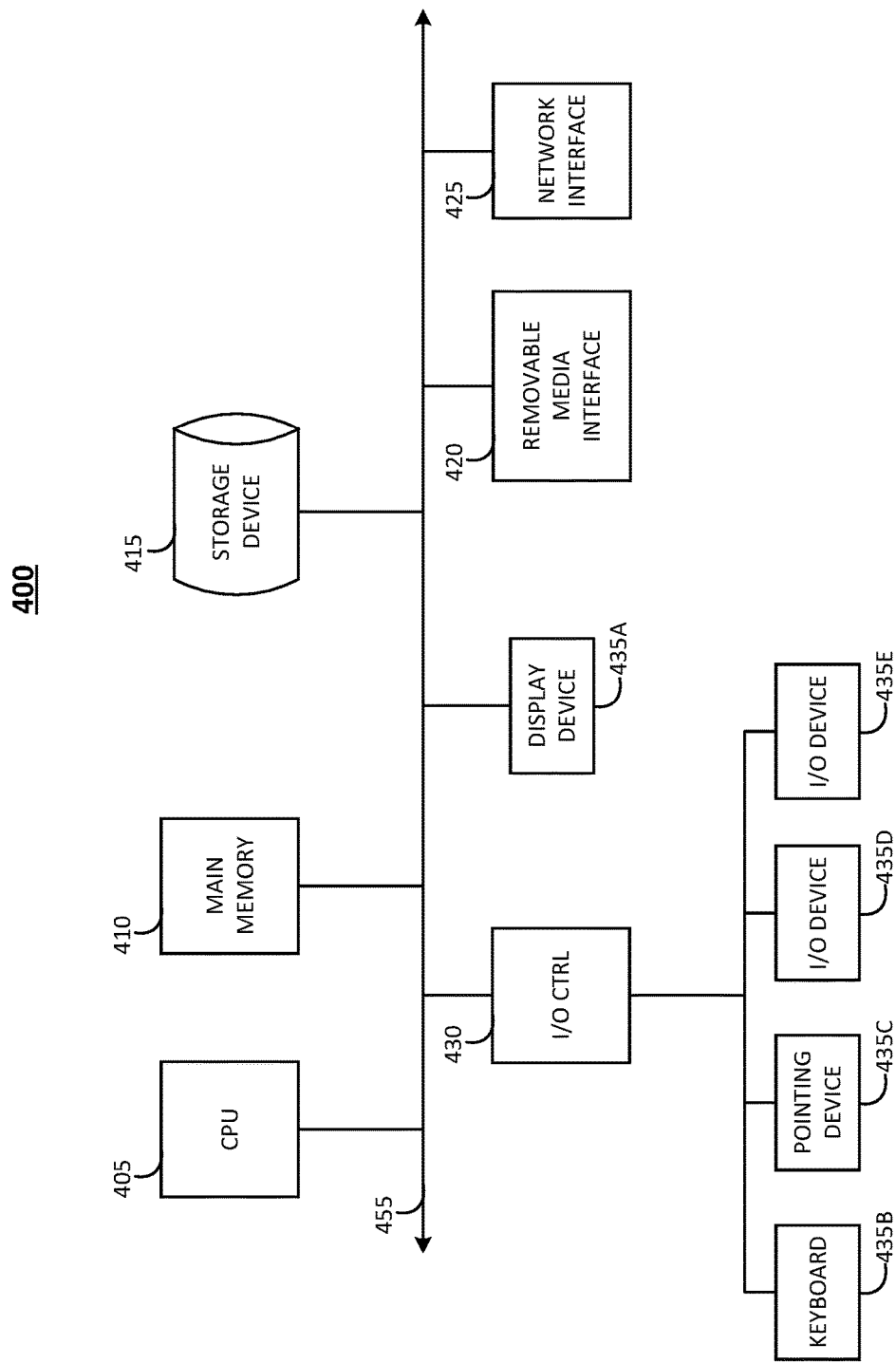
FIG. 4A is a diagram illustrating an embodiment of a computing device.

FIGS. 4A and 4B are diagrams illustrating an embodiment of a computing device as may be employed in an embodiment of the invention, indicated generally at 400. Each computing device 400 includes a CPU 405 and a main memory unit 410. As illustrated in FIG. 4A, the computing device 400 may also include a storage device 415, a removable media interface 420, a network interface 425, an input/output (I/O) controller 430, one or more display devices 435A, a keyboard 435B and a pointing device 435C (e.g., a mouse). The storage device 415 may include, without limitation, storage for an operating system and software. As shown in FIG. 4B, each computing device 400 may also include additional optional elements, such as a memory port 440, a bridge 445, one or more additional input/output devices 435D, 435E, and a cache memory 450 in communication with the CPU 405. The input/output devices 435A, 435B, 435C, 435D, and 435E may collectively be referred to herein as 435.

The CPU 405 is any logic circuitry that responds to and processes instructions fetched from the main memory unit 410. It may be implemented, for example, in an integrated circuit, in the form of a microprocessor, microcontroller, or graphics processing unit, or in a field-programmable gate array (FPGA) or application-specific integrated circuit (ASIC). The main memory unit 410 may be one or more memory chips capable of storing data and allowing any storage location to be directly accessed by the central processing unit 405. As shown in FIG. 4A, the central processing unit 405 communicates with the main memory 410 via a system bus 455. As shown in FIG. 4B, the central processing unit 405 may also communicate directly with the main memory 410 via a memory port 440.

In an embodiment, the CPU 405 may include a plurality of processors and may provide functionality for simultaneous execution of instructions or for simultaneous execution of one instruction on more than one piece of data. In an embodiment, the computing device 400 may include a parallel processor with one or more cores. In an embodiment, the computing device 400 comprises a shared memory parallel device, with multiple processors and/or multiple processor cores, accessing all available memory as a single global address space. In another embodiment, the computing device 400 is a distributed memory parallel device with multiple processors each accessing local memory only. The computing device 400 may have both some memory which is shared and some which may only be accessed by particular processors or subsets of processors. The CPU 405 may include a multicore microprocessor, which combines two or more independent processors into a single package, e.g., into a single integrated circuit (IC). For example, the computing device 400 may include at least one CPU 405 and at least one graphics processing unit.

In an embodiment, a CPU 405 provides single instruction multiple data (SIMD) functionality, e.g., execution of a single instruction simultaneously on multiple pieces of data. In another embodiment, several processors in the CPU 405 may provide functionality for execution of multiple instructions simultaneously on multiple pieces of data (MIMD). The CPU 405 may also use any combination of SIMD and MIMD cores in a single device.

FIG. 4B depicts an embodiment in which the CPU 405 communicates directly with cache memory 450 via a secondary bus, sometimes referred to as a backside bus. In other embodiments, the CPU 405 communicates with the cache memory 450 using the system bus 455. The cache memory 450 typically has a faster response time than main memory 410. As illustrated in FIG. 4A, the CPU 405 communicates with various I/O devices 435 via the local system bus 455. Various buses may be used as the local system bus 455, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 435A, the CPU 405 may communicate with the display device 435A through an Advanced Graphics Port (AGP). FIG. 4B depicts an embodiment of a computer 400 in which the CPU 405 communicates directly with I/O device 435E. FIG. 4B also depicts an embodiment in which local buses and direct communication are mixed: the CPU 405 communicates with I/O device 435D using a local system bus 455 while communicating with I/O device 435E directly.

A wide variety of I/O devices 435 may be present in the computing device 400. Input devices include one or more keyboards 435B, mice, trackpads, trackballs, microphones, and drawing tables, to name a few non-limiting examples. Output devices include video display devices 435A, speakers and printers. An I/O controller 430 as shown in FIG. 4A, may control the one or more I/O devices, such as a keyboard 435B and a pointing device 435C (e.g., a mouse or optical pen), for example.

Referring again to FIG. 4A, the computing device 400 may support one or more removable media interfaces 420, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 435 may be a bridge between the system bus 455 and a removable media interface 420.

The removable media interface 420 may, for example, be used for installing software and programs. The computing device 400 may further include a storage device 415, such as one or more hard disk drives or hard disk drive arrays, for storing an operating system and other related software, and for storing application software programs. Optionally, a removable media interface 420 may also be used as the storage device. For example, the operating system and the software may be run from a bootable medium, for example, a bootable CD.

In an embodiment, the computing device 400 may include or be connected to multiple display devices 435A, which each may be of the same or different type and/or form. As such, any of the I/O devices 435 and/or the I/O controller 430 may include any type and/or form of suitable hardware, software, or combination of hardware and software to support, enable or provide for the connection to, and use of, multiple display devices 435A by the computing device 400. For example, the computing device 400 may include any type and/or form of video adapter, video card, driver, and/or library to interface, communicate, connect or otherwise use the display devices 435A. In an embodiment, a video adapter may include multiple connectors to interface to multiple display devices 435A. In another embodiment, the computing device 400 may include multiple video adapters, with each video adapter connected to one or more of the display devices 435A. In other embodiments, one or more of the display devices 435A may be provided by one or more other computing devices, connected, for example, to the computing device 400 via a network. These embodiments may include any type of software designed and constructed to use the display device of another computing device as a second display device 435A for the computing device 400. One of ordinary skill in the art will recognize and appreciate the various ways and embodiments that a computing device 400 may be configured to have multiple display devices 435A.

An embodiment of a computing device indicated generally in FIGS. 4A and 4B may operate under the control of an operating system, which controls scheduling of tasks and access to system resources. The computing device 400 may be running any operating system, any embedded operating system, any real-time operating system, any open source operation system, any proprietary operating system, any operating systems for mobile computing devices, or any other operating system capable of running on the computing device and performing the operations described herein.

The computing device 400 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device.

In other embodiments, the computing device 400 is a mobile device. Examples might include a Java-enabled cellular telephone or personal digital assistant (PDA), a smart phone, a digital audio player, or a portable media player. In an embodiment, the computing device 400 includes a combination of devices, such as a mobile phone combined with a digital audio player or portable media player.

A computing device 400 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 400 communicates with other computing devices 400 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for automatically adjusting skill level assignments of agents in a contact center environment comprising the steps of:
   obtaining a plurality of recordings corresponding to a plurality of interactions corresponding to an agent of the contact center environment from a recording system associated with the contact center environment;
   invoking a client, by the recording system, and providing metadata describing each of the plurality of interactions to the client, the client comprising a software component that is deployed within the contact center environment;
   invoking, by the client, a service for evaluation of handling of an interaction by the agent, wherein the client provides the metadata to the service;
   performing, by the service, a number of evaluation operations on the audio of each of the plurality of recordings, wherein the number of evaluation operations comprise:
      emotion detection;
      segmentation of the audio into a plurality of segments;
      speech recognition of each of the plurality of segments;
      keyword recognition on each of the plurality of segments; and
      sentiment analysis;
   providing the results of the evaluation operations, the metadata, and an interaction duration to a neural network where the neural network determines effectiveness of the agent on handling each of the plurality of interactions; and
   updating the skill level assignments of the agent based on the effectiveness determination.

2. The method of claim 1, wherein the metadata comprises at least one of: an interaction identifier, the interaction duration, participants to the interaction, agent skills, skill level requirements, and interaction segments.

3. The method of claim 1, wherein the audio comprises two channels.

4. The method of claim 3, wherein the two channels are comprised of one channel containing a customer audio and one channel comprising an agent audio.

5. The method of claim 1, wherein the emotion detection determines the emotion experienced by a customer and the emotion experienced by the agent during the progress of an interaction.

6. The method of claim 1, wherein the segments are a defined interval of time in length.

7. The method of claim 1, wherein the sentiment analysis analyzes the agent and a customer during interaction progression.

8. The method of claim 1, wherein the effectiveness comprises comparing the agent against other interactions with similar skill requirements and other agents with similar skill levels and skills.

9. The method of claim 1, wherein the updating comprises incrementing a skill level of the agent.

10. The method of claim 1, wherein the updating comprises decrementing a skill level of the agent.

11. The method of claim 1, wherein the updating comprises leaving a skill level at an existing value.

12. A system for automatically adjusting skill level assignments of agents in a contact center environment comprising:
   a processor; and
   a memory in communication with the processor, the memory storing instructions that, when executed by the processor, causes the processor to:
      obtain a plurality of recordings corresponding to a plurality of interactions corresponding to an agent of the contact center environment from a recording system associated with the contact center environment;
      invoke a client and providing metadata describing each of the plurality of interactions to the client, the client comprising a software component that is deployed within the contact center environment;
      invoke a service for evaluation of handling of an interaction by the agent, wherein the client provides the metadata to the service;
      perform a number of evaluation operations on the audio of each of the plurality of recordings, wherein the number of evaluation operations comprise:
         emotion detection;
         segmentation of the audio into a plurality of segments;
         speech recognition of each of the plurality of segments;
         keyword recognition on each of the plurality of segments; and
         sentiment analysis;
      provide the results of the evaluation operations, the metadata, and an interaction duration to a neural network where the neural network determines effectiveness of the agent on handling each of the plurality of interactions; and
      update the skill level assignments of the agent based on the effectiveness determination.

13. The system of claim 12, wherein the metadata comprises at least one of: an interaction identifier, the interaction duration, participants to the interaction, agent skills, skill level requirements, and interaction segments.

14. The system of claim 12, wherein the audio comprises two channels, which are comprised of a customer audio channel and an agent audio channel.

15. The system of claim 12, wherein the emotion detection determines the emotion experienced by a customer and the emotion experienced by the agent during the progress of an interaction.

16. The system of claim 12, wherein the sentiment analysis analyzes the agent and a customer during interaction progression.

17. The system of claim 12, wherein the effectiveness comprises comparing the agent against other interactions with similar skill requirements and other agents with similar skill levels and skills.

18. The system of claim 12, wherein the updating comprises incrementing a skill level of the agent.

19. The system of claim 12, wherein the updating comprises decrementing a skill level of the agent.

20. The system of claim 12, wherein the updating comprises leaving a skill level at an existing value.

* * * * *